May 2, 1944. B. E. CHEELY ET AL 2,348,056
SWING PAN SPREADER
Filed Feb. 8, 1943 2 Sheets-Sheet 1
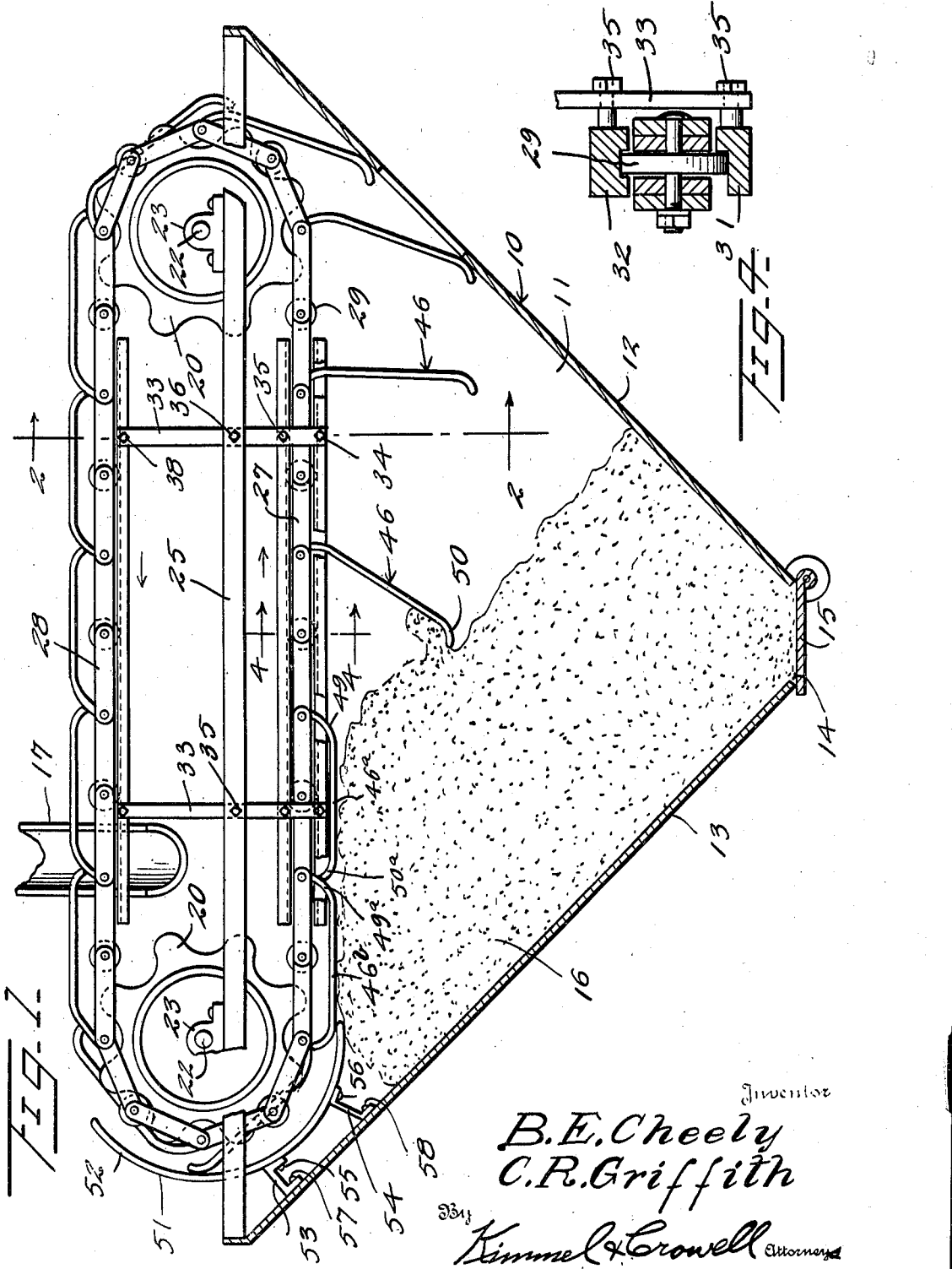

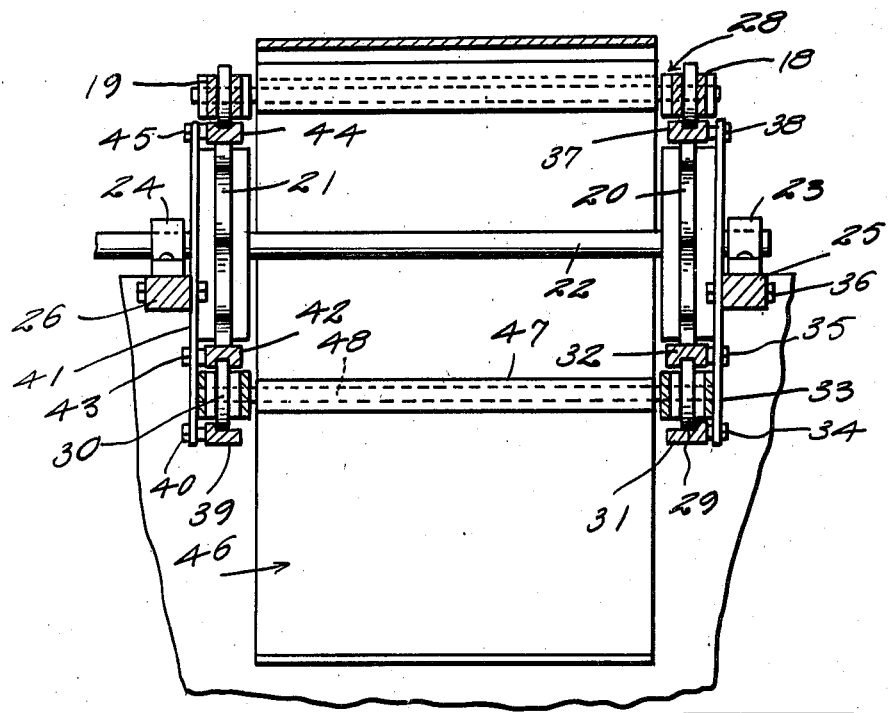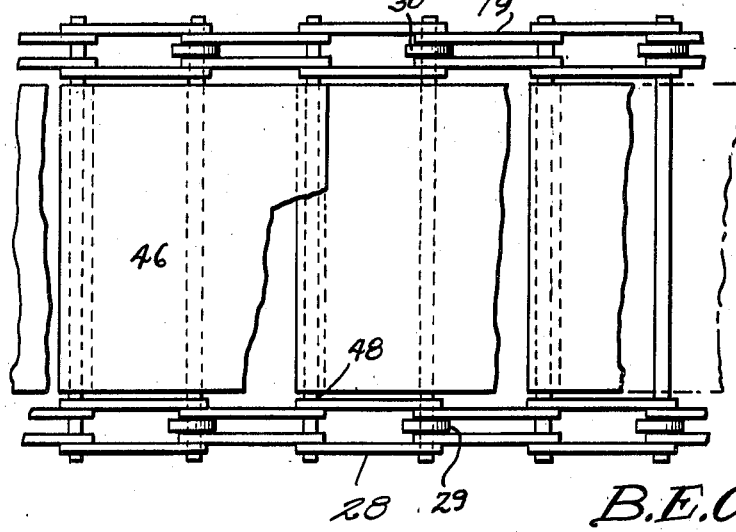

Patented May 2, 1944

2,348,056

UNITED STATES PATENT OFFICE 2,348,056

SWING PAN SPREADER

Beulan E. Cheely and Charles R. Griffith, Knoxville, Tenn.

Application February 8, 1943, Serial No. 475,158

3 Claims. (Cl. 214—17)

This invention relates to material spreading or leveling devices.

An object of this invention is to provide a spreading means for spreading material such as coal or other minerals and materials which are discharged into a hopper or bunker.

Another object of this invention is to provide a spreader or leveling means which includes an endless carrier having swingable pans onto which the material is to be discharged and moved horizontally for a distance and then discharged along an adjacent side of the previously discharged material, the pans when emptied gravitatingly swinging downward and subsequently overlapping each other on the upper run of the conveyor.

A further object of this invention is to provide in a device of this kind overlapping pans or carriers which are so constructed that a preceding pan will partially hold a succeeding pan from swinging downwardly so as to thereby provide a connected pan structure beneath the delivery chute.

A further object of this invention is to provide in a device of this kind an improved track structure for the upper and lower runs of the conveyor, so that these runs will move in horizontal planes.

The invention consists of the novel construction, combination and arrangement of parts as will be more specifically referred to and illustrated in the accompanying drawings, wherein is shown an embodiment of the invention, but it is to be understood that changes, variations and modifications may be resorted to which fall within the scope of the invention as claimed.

Figure 1 is a vertical section of a hopper having a leveling or conveying means constructed according to an embodiment of this invention mounted therein.

Figure 2 is a sectional view taken on the line 2—2 of Figure 1.

Figure 3 is a fragmentary plane view of the upper run of the conveyor.

Figure 4 is a sectional view taken on the line 4—4 of Figure 1.

Referring to the drawings, the numeral 10 designates a hopper which is formed of vertical side walls 11 and inclined end walls 12 and 13. The end walls 12 and 13 converge downwardly and form a discharge opening 14 which may be closed by a movable closure 15.

Loose material 16 is to be discharged into the hopper 10 from a delivery chute 17. The delivery chute 17 is disposed adjacent one end of the hopper 10, and in order to provide a means whereby the material 16 may be horizontally leveled after a small portion thereof has been discharged therein, I have provided an endless leveling structure which includes a pair of endless chains 18 and 19. The chains 18 and 19 are trained over sprockets 20 and 21 disposing at the ends of the loops formed by the chains and each pair of sprockets is fixedly secured to a shaft 22 journalled in bearings 23 and 24. The bearings 23 are secured to a front horizontal supporting beam 25 and the bearings 24 are secured to a rear horizontal supporting beam 26. The beams 25 and 26 are secured to the upper large end of the hopper 10, and one of the shafts 22 may be connected in any suitable manner to an operating member for moving the conveyor in the desired direction, which in the present instance effects movement of the lower run 27 to the right and the upper run 28 to the left, as viewed in Figure 1.

The chains 18 and 19 have secured thereto a plurality of rollers or wheels 29 and 30 respectively. The rollers 29 are adapted to movably engage a lower L-shaped track 31 and an upper inverted U-shaped track 32. The two tracks 31 and 32 are secured to supporting bars 33 by fastening members 34 and 35, respectively, and the bars 33 are secured by fastening members 36 to the beam 25. An upper track 37 which is U-shaped in transverse section is secured to the upper ends of the supporting bars 33 by fastening members 38. The rear chain 36 has the rollers 30 thereof movably engaging a lower rear track or rail 39 which is L-shaped in transverse section and is secured by fastening members 40 to vertical supporting bars 41. The lower run of the chain 19 also has the rollers 30 engaging an inverted U-shaped rail or track 42 which is secured by fastening members 43 to the supporting bars 41. The upper run of the chain 19 has the rollers 30 thereof engaging a U-shaped rail or track 44 and is secured by fastening members 45 to the upper ends of the bars 41.

A plurality of material spreading pans 46 are disposed between the chains 18 and 19. The pans 46 are formed with one end thereof cylindrical as at 47, and transverse connecting bars 48 are extended between and connected to the chains 18 and 19 and engaged within the cylindrical part 47 of a pan 46. Each pan 46 is formed with an upturned leading end 49 and also an upturned trailing end 50. The trailing end 50 of a preceding pan 46 is adapted to overlap the leading end of a succeeding pan so that a preceding filled pan, as shown at 46a, will have the trailing end 50a thereof abutting against the leading end 49a of a succeeding pan 46b and thereby maintain this succeeding pan 46b in substantially a horizontal position at the beginning of the lower run 27 of the conveyor.

An arcuate guard or shield 51 has the concave side 52 thereof confronting the conveyor structure, as shown in Figure 1, at the beginning of the lower runs of the chains and extends upwardly from the lower runs a distance sufficiently so that, when the pans 46 are positioned below the adjacent shaft 22 and the trailing ends 50 tend to gravitatingly drop downward, these trailing ends will slide over the shield or guard 51 and not contact with the wall 13 of the hopper. The shield or guard 51 is supported from the wall 13 by supporting members 53 and 54 which may be secured by fastening devices 55 and 56, respectively, to the convex side of the shield 51 and may be secured by fastening devices 57 and 58 to the inner side of the hopper wall 13. These supporting members 53 and 54 are of substantially U-shape in transverse configuration.

In the use and operation of this spreader structure the chute 17 is adapted to discharge the material between the upper and lower runs 28 and 27 respectively from the rear. Where the hopper 10 is initially empty the pans 46 after passing the guard or shield 51 will gravitatingly swing downwardly to a substantially vertical position and the material will drop between the hanging pans into the lower portion of the hopper. As the material builds a point adjacent the lower run 27 of the conveyor or spreading, the pans 46 will contact with the material which will hold the pans 46 in a horizontal position as shown in Figure 1. The material from the chute 17 will at this time drop into the overlapping pans 46, and the material in these pans will be moved to the right until the foremost pan reaches the inclined side of the material 16. At this time the filled pan will begin to drop downwardly and discharge the material in a smooth manner which will tend to prevent generation of dust or the like. This procedure will go on until the hopper 10 is completely filled. After the pans 46 on the lower run 27 of the conveyor are empty they will assume a substantially perpendicular position as shown in Figure 1 for the inoperative portion of the lower run of the conveyor, and will then strike the inclined wall 12 and gradually swing in the direction of the adjacent side of the conveyor. On the upper run of the conveyor the pans 46 are disposed in contacting relation one with another thereby forming a closed movable top wall for the hopper which will prevent any dust generated in the hopper 10 from rising out of the hopper.

What is claimed is:

1. Apparatus for leveling material in a hopper comprising a pair of endless members, means supporting said members for movement horizontally across the upper end of the hopper, a plurality of material distributing members pivotally supported between said endless members, said distributing members being of such construction that on the upper runs of said endless members said distributing members will overlap each other to thereby form a closed moving top for said hopper, and an arcuate combined shield and guide member fixed to one end of said hopper for guiding said distributing members as they move downwardly toward the lower run and cooperating with said distributing members in closing the adjacent end of said hopper.

2. In combination a hopper open at the top thereof, an endless conveyor, means supporting said conveyor for horizontal movement adjacent the top of the hopper, said conveyor including combined material distributing and top wall forming members, said members on the lower run of the conveyor acting to distribute material within the hopper and on the upper run of the conveyor acting to form a closed top wall, and an arcuate shield fixed to one end of said hopper and engaging about one end of said conveyor, said shield extending between the sides of said hopper and cooperating with said distributing members in closing the adjacent end of said hopper.

3. In combination a hopper open at the top thereof, an endless conveyor, means supporting said conveyor for horizontal movement adjacent the top of the hopper, said conveyor comprising a pair of endless flexible members, combined material distributing and top wall forming members disposed between said endless members, means pivotally supporting said combined material distributing and top wall forming members between said flexible members whereby said material distributing members will overlap each other on the upper run of the conveyor, an arcuate shield fixed to one end of said hopper and engaging about one end of said conveyor, said shield extending between the sides of said hopper and cooperating with said distributing members in closing the adjacent end of said hopper, and means discharging material into the hopper between the runs of said conveyor.

BEULAN E. CHEELY.
CHARLES R. GRIFFITH.